United States Patent [19]

Mitsuji et al.

[11] Patent Number: 4,948,829

[45] Date of Patent: Aug. 14, 1990

[54] AQUEOUS COATING COMPOSITION AND COATING METHOD USING SAME

[75] Inventors: Masaru Mitsuji, Zama; Mistugu Endo, Ashigarakami; Youji Kawachi, Omihachiman; Akira Asada, Nara, all of Japan

[73] Assignees: Kansai Paint Co., Ltd., Amagasaki; Sanyo Chemical Industries, Ltd., Kyoto, both of Japan

[21] Appl. No.: 347,645

[22] Filed: May 5, 1989

[30] Foreign Application Priority Data

May 13, 1988 [JP] Japan ................. 63-117769

[51] Int. Cl.$^5$ ............... C09D 175/04; C09D 4/02; C09D 5/02
[52] U.S. Cl. .................. 524/457; 524/501; 524/507; 524/555; 524/591; 525/278; 526/301
[58] Field of Search ............ 524/501, 507, 457, 591, 524/555; 525/278; 526/301

[56] References Cited

U.S. PATENT DOCUMENTS

| | | | |
|---|---|---|---|
| 3,376,216 | 5/1973 | Hermann et al. | 208/179 |
| 4,644,030 | 2/1987 | Loewrigkeit et al. | 524/457 |
| 4,730,021 | 3/1988 | Zom et al. | 524/457 |

FOREIGN PATENT DOCUMENTS

0260447-A2  3/1988  European Pat. Off. .
0308115-A2  3/1989  European Pat. Off. .

*Primary Examiner*—Joseph L. Schofer
*Assistant Examiner*—Thomas McDonald, Jr.
*Attorney, Agent, or Firm*—Armstrong, Nikaido, Marmelstein, Kubovcik & Murray

[57] ABSTRACT

Disclosed are (1) an aqueous coating composition which is characterized in that the composition comprises:
(A) an acrylic resin-type emulsion,
(B) a urethane resin-type emulsion and
(C) a crosslinking agent the component (B) being a self-emulsifiable urethane emulsion prepard by subjecting a urethane prepolymer to reaction for chain extension by water and to emulsification after or during neutralization of the urethane prepolymer with a tertiary amine, the urethane prepolymer consisting essentially of (i) an aliphatic and/or alicyclic diisocyanate, (ii) a polyether diol and/or polyester diol both having a number-average molecular weight of about 500 to about 5000, (iii) a low-molecular weight polyhydroxyl compound and (iv) a dimethylolalkanoic acid in an NCO/OH ratio by equivalent of 1.1–1.9/1; and (2) a two-coat one-bake coating method characterized by use of said aqueous coating composition as the base-coat composition.

8 Claims, No Drawings

AQUEOUS COATING COMPOSITION AND COATING METHOD USING SAME

The present invention relates to a novel aqueous coating composition and a coating method using the composition.

The body panels of motor vehicles, two-wheel vehicles, electric products, etc. which must have a beautiful appearance have been conventionally finished with an organic solvent-diluted thermosetting top-coat composition capable of giving a coating outstanding in surface smoothness, distinctness-of-image gloss, weatherability and the like. The body panels thereof are generally coated by a two-coat one-bake method comprising coating panels with an organic solvent-diluted thermosetting base-coat composition containing a coloring pigment and/or metallic pigment, air-drying the coating, applying a transparent organic solvent-diluted top-coat composition to the coating and curing the two coatings at the same time by heating.

From the viewpoints of air-pollution problems and savings in resources, it has been strongly desired in recent years to reduce the quantities of organic solvents to be used, and investigations are under way on base-coat compositions used in the two-coat one-bake method for a change-over from base-coat compositions containing a large quantity of organic solvent to aqueous compositions.

We previously proposed a two-coat one-bake coating method using an aqueous base-coat composition predominantly containing a water-dispersible acrylic resin, amino resin and a metallic pigment and/or coloring pigment (Japanese Unexamined Patent Publication No. 193676/1987). However, we have found that while capable of giving coatings excellent in surface smoothness, finished appearance and the like, the proposed coating method provides coatings with poor chipping resistance when used for covering automotive body panels.

For example, a motor vehicle running on a road bumps off sand particles, pebbles, rock salts and the like on the road, sending them flying, whereby some of them may clash against the coating on the body panels, frequently scratching or peeling the coating. The scratches and peeling may deteriorate the coating film appearance and may partially expose the underlying steel panels, rendering them prone to corrosion. Consequently it is markedly important to provide coating compositions for motor vehicles with improved chipping resistance.

In recent years, plastics have been increasingly used to replace metals as automotive body panel materials. In this situation, it is strongly desired to coat plastics body panels with aqueous coating compositions.

An object of the present invention is to provide a novel aqueous coating composition well-suited as a base-coat composition for use in the two-coat one-bake coating method, and a coating method using the composition.

Another object of the invention is to provide a novel aqueous coating composition capable of giving a coating which has surface smoothness, distinctness-of-image gloss and weatherability comparable to or higher than when formed from conventional organic solvent-diluted thermosetting coating compositions by the two-coat one-bake method and which is improved in chipping resistance and applicable to plastics materials, and a coating method using the composition.

These and other objects of the invention will become apparent from the following description.

The present invention provides an aqueous coating composition which is characterized in that the composition comprises:

(A) an acrylic resin-type emulsion,
(B) a urethane resin-type emulsion and
(C) a crosslinking agent the component (B) being a self-emulsifiable urethane emulsion prepared by subjecting a urethane prepolymer to reaction for chain extension by water and to emulsification after or during neutralization of the urethane prepolymer with a tertiary amine, the urethane prepolymer consisting essentially of (i) an aliphatic and/or alicyclic diisocyanate, (ii) a polyether diol and/or polyester diol both having a number-average molecular weight of about 500 to about 5000, (iii) a low-molecular weight polyhydroxyl compound and (iv) a dimethylolalkanoic acid in an NCO/OH ratio by equivalent of 1.1–1.9/1.

The present invention also provides a two-coat one-bake coating method comprising the steps of coating a substrate with a base-coat composition containing a coloring pigment and/or metallic pigment, applying a transparent top-coat composition to the coating while the coating is still uncured and curing the two coatings at the same time by heating, the method being characterized by the use of the above aqueous coating composition as the base-coat composition.

We carried out extensive research on aqueous coating compositions which are capable of giving coatings comparable to or superior to those produced by the two-coat one-bake coating method using a conventional organic solvent-diluted thermosetting coating composition, and which are improved in resistance to chipping and suitable to coat plastics materials. Our research has revealed that an aqueous coating composition comprising an acrylic resin-type emulsion, the above-specified urethane resin-type emulsion and a curing agent is useful as a base-coat composition in two-coat one-bake methods and can satisfactorily fulfil said objects.

The present invention has been accomplished based on this novel finding.

First the aqueous coating compositions of the present invention will be described below in detail.

(1) Component (A): Acrylic resin-type emulsion

This emulsion has acrylic resin particles uniformly dispersed in an aqueous medium. The emulsion can be prepared by subjecting an acrylic monomer to emulsion polymerization in an aqueous solution of a dispersion stabilizer.

Examples of dispersion stabilizers useful in the polymerization are polyoxyethylene nonyl phenyl ether and like nonionic surfactants, polyoxyethylene alkyl aryl ether sulfuric acid ester salt and like anionic surfactants, and acrylic resins and like water-soluble resins about 20 to about 150 in acid value and about 5000 to about 30000 in number-average molecular weight.

The aqueous medium is a solution of the dispersion stabilizer in water.

The acrylic monomer for use in emulsion polymerization in the aqueous medium is at least one monomer selected from: esters of acrylic or methacrylic acid and monohydric alcohol having 1 to 20 carbon atoms, examples of said esters being methyl acrylate or methacrylate, ethyl acrylate or methacrylate, propyl acrylate or methacrylate, butyl acrylate or methacrylate, 2-ethylhexyl acrylate or methacrylate and the like; compounds having two or more polymerizable double bonds per molecule and prepared by reacting an acrylic or methacrylic acid with a dihydric or polyhydric alcohol having 2 to 16 carbon atoms, examples of such compounds being ethylene glycol diacrylate or dimethacrylate, 1,6-hexane diacrylate or dimethacrylate, trimethylolpropane diacrylate or dimethacrylate, allyl acrylate or methacrylate, trimethylolpropane triacrylate or trimethacrylate and the like; hydroxy-containing alkyl ($C_{2-10}$) acrylate or methacrylate such as hydroxyethyl acrylate or methacrylate, hydroxypropyl acrylate or methacrylate and the like; etc.

These acrylic monomers can be used conjointly with other monomers copolymerizable therewith. Examples of such monomers are $\alpha, \beta$-ethylenically unsaturated carboxylic acids such as acrylic or methacrylic acid and like monocarboxylic acids, maleic acid, fumaric acid, itaconic acid and like dicarboxylic acids and half-esters of these dicarboxylic acids; N-propoxymethyl acrylamide or methacrylamide, N-butoxymethyl acrylamide or methacrylamide, glycidyl acrylate or methacrylate, styrene and vinyl acetate, etc. among which the monomers having hydroxyl or like crosslinkable functional group are preferred to enhance the crosslinking reactivity between the monomer and the component (C) to be described later.

It is preferred to use as the component (A) an emulsion prepared by subjecting to emulsion polymerization the $\alpha, \beta$-ethylenically unsaturated carboxylic acid and the acrylic monomer. The emulsion prepared by a multi-stage polymerization process gives a coating composition improved in amenability to coating operation, hence desirable. That is, an acrylic monomer containing a small amount of (e.g. about 3% by weight or less) or no $\alpha, \beta$-ethylenically unsaturated acid is polymerized and the resulting polymer is subsequently copolymerized with an acrylic monomer containing a large amount (e.g. about 5 to about 30% by weight) of $\alpha, \beta$-ethylenically unsaturated acid. The emulsion obtained increases in viscosity by neutralizing the unsaturated acid with a neutralizing agent and is therefore desirable also in view of the amenability to coating operation (prevention of sagging or mottling). Examples of useful neutralizing agents are ammonia and water-soluble amino compounds such as monoethanolamine, ethylamine, 2-amino-2-methylpropanol, dimethylamine, diethylamine, triethylamine, propylamine, dipropylamine, isopropylamine, diisopropylamine, diethanolamine, triethanolamine, butylamine, dibutylamine, 2-ethylhexylamine, ethylenediamine, propylenediamine, methylethanolamine, dimethylethanolamine, diethylethanolamine and morpholine. Among them, triethylamine, dimethylethanolamine and like tertiary amines, diethanolamine, 2-amino-2-methylpropanol and the like are especially desirable.

Also usable to fulfill the objects of the invention is the component (A) having a viscosity increased by addition of neutralized acrylic resin of high acid value or a thickener.

Preferably the dispersed resin particles in the component (A) formed by emulsion polymerization are crosslinked ones in view of mechanical stability, storage stability and the like. The crosslinked dispersed resin particles can be formed, for example, by emulsion-polymerizing a mixture of two kinds of monomer, i.e. a monomer having one polymerizable unsaturated bond per molecule and a monomer having two or more polymerizable unsaturated bonds per molecule. While the proportions of the two monomers are not specifically limited, usually about 15% by weight or less, preferably about 5% by weight or less, of the latter is used based on the combined amount of the two monomers.

The dispersed resin particles predominantly composed of acrylic monomer in the component (A) are preferably those having a mean particle size of about 0.05 to about 1.0 μm.

(2) Component (B): Urethane resin-type emulsion

The component (B) of the invention is an aqueous dispersion of self-emulsifiable urethane resin of about 0.001 to about 1.0 μm in mean particle size prepared by the following method. First a urethane prepolymer is synthesized by subjecting to a one-shot or multi-stage polymerization (optionally in a hydrophilic organic solvent free of active hydrogen): (i) an aliphatic and/or alicyclic diisocyanate, (ii) a polyether diol or polyester diol both having a number-average molecular weight of about 500 to about 5000 or a mixture thereof, (iii) a low-molecular weight polyhydroxyl compound and (iv) a dimethylolalkanoic acid in an NCO/OH equivalent ratio of 1.1–1.9 : 1. The prepolymer thus obtained is mixed with water after or during neutralization of prepolymer with a tertiary amine, and the resulting mixture is subjected to reaction for chain extension by water while being emulsified and dispersed in water. Thereafter, when required, the organic solvent is distilled off.

Examples of the component (i) for use in the preparation of the urethane prepolymer, i.e., aliphatic or alicyclic diisocyanate, include aliphatic diisocyanates having 2 to 12 carbon atoms such as hexamethylene diisocyanate, 2,2,4-trimethylhexane diisocyanate and lysine diisocyanate; alicyclic diisocyanates having 4 to 18 carbon atoms such as 1,4-cyclohexane diisocyanate, 1-isocyanato-3-isocyanatomethyl-3,5,5-trimethylcyclohexane (isophorone diisocyanate), 4,4'-dicyclohexylmethane diisocyanate, methylcyclohexylene diisocyanate and isopropylidene dicyclohexyl-4,4'-diisocyanate; modified products of these diisocyanates (such as those containing carbodiimide, uretdione, uretone imine or the like); and mixtures of at least two of them; etc. Among them, preferred are alicyclic diisocyanates, especially 1,4-cyclohexane diisocyanate, 1-isocyanato-3-isocyanatomethyl-3,5,5-trimethylcyclohexane and 4,4'-dicyclohexylmethane diisocyanate.

Use of aromatic diisocyanate as the component (i) tends to yellow the coating being baked for curing and to cause the discoloration of coating exposed to ultraviolet light, hence undesirable.

Examples of the component (ii) for use in the preparation of the urethane prepolymer, i.e., polyether diols and polyester diols both having a number-average molecular weight of about 500 to about 5000, preferably 1000 to 3000, include those prepared by polymerizing or copolymerizing alkylene oxide (such as ethylene oxide, propylene oxide, butylene oxide or the like) and/or a heterocyclic ether (such as tetrahydrofuran or the like), examples of resulting polymers being polyethylene glycol, polypropylene glycol, polyethylene-propylene (block or random) glycol, polytetramethylene ether glycol, polyhexamethylene ether glycol and polyoctamethylene ether glycol; condensation polymers of dicarboxylic acid (such as adipic acid, succinic acid, sebatic acid, glutaric acid, maleic acid, fumaric acid, phthalic acid or the like) with glycol (such as ethyelene glycol, propylene glycol, 1,4-butanediol, 1,6-hexanediol, 3-methyl-1,5-pentanediol, neopentyl glycol, bishydroxymethylcyclohexane or the like), examples of the condensation polymers being polyethylene adipate, polybutylene adipate, polyhexamethylene adipate, polyneopentyl adipate, poly-3-methylpentyl adipate, polyethylene/butylene adipate and polyneopentyl-/hexyl adipate; polylactone diols such as polycaprolactone diol and poly-3-methylvalerolactone diol; polycarbonate diols; mixtures of at least two of them; etc.

Examples of the component (iii) for use in the preparation of the urethane prepolymer, i.e., low-molecular weight polyhydroxyl compounds, include those of 500 or less in molecular weight, e.g. glycols as exemplified above as the material for the polyester diol and low-molecular weight addition products (molecular weight of 500 or less) of the glycol with alkylene oxide; trihydric alcohols such as glycerin, trimethylol ethane, trimethylol propane and the like and low-molecular weight addition products (molecular weight of 500 or less) of the alcohol with alkylene oxide; mixtures of at least two of them; etc. The low-molecular weight polyhydroxyl compound is used in an amount of about 0.1 to about 20% by weight, preferably about 0.5 to about 10% by weight, based on the polyether diol or polyester diol.

Examples of the component (iv) for use in the preparation of the urethane prepolymer, i.e., dimethylolalkanoic acid, include dimethylolacetic acid, dimethylolpropionic acid, dimethylolbutyric acid, etc. among which dimethylolpropionic acid is preferred. The dimethylolalkanoic acid is used in an amount of about 0.5 to about 5% by weight, preferably about 1 to about 3% by weight (calculated as the carboxyl group), based on the urethane prepolymer prepared by reacting the components (i) to (iv). If the amount of carboxyl group is less than about 0.5% by weight, it is difficult to prepare a stable emulsion. However, if the amount exceeds 5% by weight, the hydrophilic property is increased, rendering the emulsion highly viscous and decreasing the water resistance of coating.

Examples of tertiary amines useful for neutralization of dimethylolalkanoic acid are trialkylamines such as trimethylamine, triethylamine, triisopropylamine, tri-n-propylamine, and tri-n-butylamine; N-alkylmorpholines such as N-methylmorpholine and N-ethylmorpholine; N-dialkylalkanolamines such as N-dimethylethanolamine and N-diethylethanolamine; mixtures of at least two of them; etc. Among them, preferable is trialkylamine and more preferable is triethylamine. The neutralization degree of tertiary amine is about 0.5 to about 1 equivalent, preferably about 0.7 to about 1 equivalent, per equivalent of carboxyl group of dimethylolalkanoic acid.

(3) Component (C): Crosslinking agent

The crosslinking agent is used for crosslinking and curing the component (A) and/or (B). Melamine resins and phenolformaldehyde resins for coating materials are suitable for use. While water-soluble or hydrophobic crosslinking agents are usable, a hydrophobic one is preferably used to improve the amenability to coating operation, storage stability, humidity resistance and the like.

Hydrophobic melamine resins suitable for use herein are those having a solvent dilution ratio of about 20 or less, preferably about 15 or less and a weight-average molecular weight of about 800 to about 4000, preferably about 1000 to about 3000. The solvent dilution ratio used in the present invention is an index indicating the solubility of melamine resin in hydrophilic solvents. The lower the ratio, the more hydrophobic is the resin. The solvent dilution ratio is determined by the following method. Two grams of melamine resin is placed into a 50-cc beaker, which is then placed on paper bearing a print of No.5 type. Subsequently, at 25° C. a mixture of water and methanol (35/65 in weight ratio) is added dropwise to the resin with stirring until the print becomes illegible. The amount (cc) thus added is divided by the amount of the melamine resin to obtain a value (cc/g) as the ratio.

The melamine resin is not limited specifically insofar as it fulfills the solvent dilution ratio and molecular weight requirements. The resin is usable as etherified variously, for example, as modified with at least one of methyl alcohol, ethyl alcohol, isopropyl alcohol, n-butyl alcohol, isobutyl alcohol, octyl alcohol, 2-ethylhexyl alcohol, benzyl alcohol, etc. According to the invention, it is suitable to use the resin as modified with an alcohol having at least four carbon atoms, more preferably four to seven carbon atoms. The amount of ether groups in the melamine resin, although not limited specifically, is suitably up to about 5 moles, preferably about 1.5 to about 3 moles, per triazine ring. Further as to the functional groups such as amino, imino and methylol, the kind and amount of remaining functional groups are not limited specifically provided that the foregoing solvent dilution ratio and molecular weight requirements are satisfied. Usually, however, the amount of imino groups (inclusive of amino groups), as well as of methylol groups, is 0.2 to 2.0 moles, preferably 0.5 to 1.5 moles, per triazine ring.

The hydrophobic crosslinking agent is preferably mixed with a water-soluble resin before mixing with the components (A) and (B).

Water-soluble resins for use herein are those having introduced therein a quantity of hydrophilic groups, such as carboxyl (—COOH), hydroxyl (—OH), methylol (—CH$_2$OH), amino (—NH$_2$), sulfo (—SO$_3$H) or polyoxyethylene bond (—(CH$_2$CH$_2$O)$_n$—). Examples of such resins are acrylic resin, alkyd resin, polyester resin, melamine resin, epoxy resin and the like. The most typical of such water-soluble resins are those having carboxyl groups introduced therein, neutralized to an alkali salt and thereby made soluble in water.

Suitable proportions of the hydrophobic crosslinking agent and water-soluble resin are about 20 to about 100 parts by weight, preferably about 28 to about 80 parts by weight, of the latter per 100 parts by weight of the former calculated as solids. The two components can be mixed by any suitable method, for example by mixing the two components together using a dissolver, homomixer, ball mill, sand mill or the like. When required, a coloring pigment, extender pigment, etc. may be kneaded with the mixture in this step. Further when required, a small amount of hydrophilic solvent, such as alcohol solvent or ether solvent, can be added to the mixture in this step. Next, deionized water is added in small portions to the mixture in about 0.5 to about 5 times the combined amount by weight of the two components while vigorously stirring the mixture, whereby a crosslinking agent is obtained in the form of a milky white or colored aqueous dispersion. When free from pigment, the dispersion contains particles about 0.05 to about 0.5 μm in mean particle size.

The aqueous coating composition of the invention may contain a metallic pigment and/or coloring pigment which are usually used for coating compositions. Examples of useful metallic pigments are aluminum flake, micaceous iron oxide, mica flake, metallic oxide-coated macaceous iron oxide, metallic oxide-coated mica flake, etc. Examples of useful coloring pigments are titanium dioxide, iron oxide, chromium oxide, lead chromate, carbon black and like inorganic pigments, Phthalocyanine Blue, Phthalocyanine Green, Carbazole Violet, Anthrapyrimidine Yellow, Flavanthrone Yellow, Isoindoline Yellow, Indanthrone Blue, Quinacridone Violet and like organic pigments.

The aqueous coating composition of the invention contains the components (A) to (C) in the following proportions. The component (A)/component (C) ratio is preferably between 90/10 and 60/40, more preferably between 80/20 and 62/38. The ratio of mixture of components (A) and (C)/component (B) ranges preferably between 95/5 and 60/40, more preferably between 90/10 and 65/35, in application of aqueous coating composition to metallic substrates and ranges preferably between 90/10 and 20/80, more preferably between 80/20 and 30/70, in application thereof to plastics substrates. When a hydrophobic crosslinking agent is used as the component (C) along with a water-soluble resin having crosslinkable functional group, it is desired that the amount of the water-soluble resin be included in the amount of the component (A) so that the amounts of the component (C) (hydrophobic crosslinking agent) and the component (B) are determined within said ranges based on the amount of the component (A).

The coating methods using the aqueous coating composition of the present invention will be described below.

Suitable substrates to be coated with the aqueous coating composition of the invention include outer panels of automobiles, buses, trucks, motorcycles and the like, but are not specifically limited thereto. Useful substrates may be those made of and of metals and plastics. Metallic substrates may be those coated with a primer or an intercoat composition.

It is preferred to provide the aqueous coating composition of the present invention adjusted to about 10 to about 40 wt. % content of solids and to a viscosity of about 800 to about 5000 cps/6 r.p.m. (B-type viscometer) by adding deionized water and, when required, additives such as thickener and defoaming agent as in a usual process.

The aqueous coating composition of the invention is significantly suitable as a base-coat composition in the two-coat one-bake coating method. For example, the composition is applied to a metallic substrate as by spray coating, electrostatic coating or the like so as to form a coating of about 10 to about 50 μm in dry thickness and then dried in air or hot air until the volatile content of the coating reduces to about 25 wt. % or lower. A transparent top-coat composition is then applied as by electrostatic spray coating to the resulting coating to a dry thickness of about 15 to about 70 μm. Subsequently, the coated substrate is set in a usual manner and then heated to about 120 to about 160° C. for about 15 to about 30 minutes to cure the coatings. The composition of the present invention is highly amenable to the coating operation, readily forming a beautiful coating.

The composition of the invention is applied to plastics substrates in the same manner as for metallic substrates after degreasing or priming the substrate surface when so required. The composition thus applied is cured at a temperature lower than the thermal deformation temperature of plastics.

While suitable as a base-coat composition in the two-coat one-bake method as described hereinbefore, the aqueous coating composition of the invention may be applied to form a single layer.

A conventional transparent top-coat composition can be applied over the coating formed from the aqueous coating composition of the invention. Examples of conventional top-coat compositions are amino resin/alkyd resin, acrylic resin, amino resin/acrylic resin, amino resin/oil-free alkyd resin, silicone polyester resin, fluorocarbon resin, urethane resin and like coating compositions of the organic solvent dilution type. Further the top-coat composition is preferably of the highly solid type which contains a reduced amount of organic solvent from the viewpoints of environmental problems and savings in resources. A powder coating composition is also usable.

The present invention will be described in greater detail with reference to the following preparation examples, examples and comparative examples, wherein the parts and percentages are all by weight.

PREPARATION EXAMPLE 1

Preparation of acrylic resin-type emulsion (A-1)

Into a reactor were placed 140 parts of deionized water, 2.5 parts of 30% "Newcol 707SF" (anionic surfactant, product of Nippon Nyukazai Co., Ltd.) and 1 part of the monomer mixture (1) given below, followed by stirring in a nitrogen stream, and further by addition of parts of 3% ammonium persulfate at 60° C. Subsequently, the mixture was heated to a temperature of 80° C. A monomer emulsion comprising 79 parts of the monomer mixture (1), 2.5 parts of 30% "Newcol 707SF", 4 parts of 3% ammonium persulfate and 42 parts of deionized water was thereafter placed into the reactor by a metering pump over a period of 4 hours. After the completion of addition, the mixture was aged for 1 hour.

At 80° C., 20.5 parts of the following monomer mixture (2) and 4 parts of 3% aqueous solution of ammonium persulfate were concurrently placed dropwise into the reactor over a period of 1.5 hours. After the completion of addition, the resulting mixture was aged for 1 hour, then diluted with 30 parts of deionized water and filtered with 200-mesh nylon cloth at 30° C. Deionized water was added to the filtrate, and the pH of the mixture was adjusted to 7.5 with dimethylaminoethanolamine, giving an acrylic resin-type emulsion (A-1) containing particles with a mean particle size of 0.1 μm and having a nonvolatile content of 20%.

| Monomer mixture (1) | |
|---|---|
| Methyl methacrylate | 55 parts |
| Styrene | 8 parts |
| n-Butyl acrylate | 9 parts |
| 2-Hydroxyethyl acrylate | 5 parts |
| 1,6-Hexanediol diacrylate | 2 parts |
| Methacrylic acid | 1 part |
| Monomer mixture (2) | |
| Methyl methacrylate | 5 parts |
| n-Butyl acrylate | 7 parts |
| 2-Ethylhexyl acrylate | 5 parts |
| Methacrylic acid | 3 parts |

-continued

| | |
|---|---|
| 30% "Newcol 707SF" | 0.5 part |

PREPARATION EXAMPLE 2

Preparation of acrylic resin-type emulsion (A-2)

The same procedure as in Preparation Example 1 was conducted with the exception of using the monomer mixture (3) given below in place of the monomer mixture (1) used in Preparation Example 1. The procedure gave an acrylic resin-type emulsion (A-2) containing resin particles of 0.1 μm in mean particle size and having a nonvolatile content of 20%.

| Monomer mixture (3) | |
|---|---|
| Methyl methacrylate | 52.5 parts |
| Styrene | 10 parts |
| n-Butyl acrylate | 9 parts |
| 2-Hydroxyethyl acrylate | 5 parts |
| Allyl methacrylate | 2.5 parts |
| Methacrylic acid | 1 part |

PREPARATION EXAMPLE 3

Preparation of urethane resin-type emulsion (B-1)

A reactor for polymerization was charged with 115.5 parts of polybutylene adipate of 2000 in number-average molecular weight, 115.5 parts of polycaprolactone diol of 2000 in number-average molecular weight, 23.2 parts of dimethylolpropionic acid, 6.5 parts of 1,4-butanediol and 120.1 parts of 1-isocyanato-3-isocyanatomethyl-3,5,5-trimethylcyclohexane (IPDI). The mixture was reacted in nitrogen atmosphere with stirring at 85° C for 7 hours, giving an NCO-terminated prepolymer containing 4.0% NCO. The prepolymer was cooled to 50° C. and was homogeneously dissolved in 165 parts of acetone. Then 15.7 parts of triethylamine was added with stirring. While maintaining the mixture at 50° C. or lower, 600 parts of ion exchange water was added. The obtained aqueous dispersion was held at 50° C. for 2 hours to complete the reaction for chain extension by water. The acetone was distilled off at 70° C. or lower under reduced pressure, giving 944 parts of a urethane resin-type emulsion (B-1) containing 42.0% solids.

PREPARATION EXAMPLE 4

Preparation of urethane resin-type emulsion (B-2)

A pressure reactor for polymerization was charged with 115.5 parts of polypropylene glycol of 2100 in number-average molecular weight, 115.5 parts of polytetramethylene ether glycol of 2000 in number-average molecular weight, 23.2 parts of dimethylolpropionic acid, 6.7 parts of trimethylolpropane, 141.7 parts of 4,4'-dicyclohexylmethane diisocyanate and 174 parts of acetone. After replacing the atmosphere in the reactor with nitrogen, the mixture was reacted with stirring at 85° C. for 5 hours, giving a solution of an NCO-terminated prepolymer in acetone with 2.6% NCO content. The same procedure as in Preparation Example 1 was followed, giving 1045 parts of a urethane resin-type emulsion (B-2) containing 40.1% solids.

PREPARATION EXAMPLE 5

Preparation of urethane resin-type emulsion (B-3)

A reactor for polymerization was charged with 115.5 parts of polycaprolactone diol of 2050 in number-average molecular weight, 115.5 parts of polyneopentyl/hexyl adipate of 2450 in number-average molecular weight, 9.9 parts of 1,6-hexanediol and 141.7 parts of 4,4'-dicyclohexylmethane diisocyanate. The mixture was reacted in nitrogen atmosphere at 110° C. for 3 hours. Dimethylolpropionic acid (23.2 parts) was added thereto and the mixture was reacted at the same temperature for 3 hours, giving a prepolymer with 3.7% NCO content. The prepolymer was uniformly dissolved in 176 parts of acetone. The solution of prepolymer in acetone was added with high speed stirring to a solution of 16.7 parts of triethylamine in 640 parts of water charged in another reactor. The mixture was treated in the same manner as in Preparation Example 1, giving 1018 parts of a urethane resin-type emulsion (B-3) containing 41.5% solids.

PREPARATION EXAMPLE 6

Preparation of water-soluble resin

Into a reactor were placed 60 parts of butyl cellosolve and 15 parts of isobutyl alcohol, which were then heated to 115° C. in a nitrogen stream. Then a mixture of 26 parts of n-butyl acrylate, 47 parts of methyl methacrylate, 10 parts of styrene, 10 parts of 2-hydroxyethyl methacrylate, 6 parts of acrylic acid and 1 part of azoisobutyronitrile was placed into the reactor over a period of 3 hours. After the completion of addition, the mixture was aged at 115° C. for 30 minutes, and a mixture of 1 part of azobisisobutyronitrile and 115 parts of butyl cellosolve was added to the mixture over a period of 1 hour. The resulting mixture was aged for 30 minutes and filtered with 200-mesh nylon cloth at 50° C.

The reaction product obtained was 48 in acid value, $Z_4$ in viscosity (Gardener bubble viscometer) and 55% in nonvolatile content. The product was neutralized with the equivalent of dimethylaminoethanol. With addition of deionized water, the product gave a 50% aqueous solution of acrylic resin.

PREPARATION EXAMPLE 7

Preparation of crosslinking agent (C-1)

Into a stirring container was placed 41.7 parts of a commercial hydrophobic melamine resin ("Uban 28SE," product of Mitsui Toatsu Chemical Co., Ltd., nonvolatile content 60%, solvent dilution ratio 0.4). The aqueous acrylic resin solution (20 parts) obtained in Preparation Example 6 was added to the resin. While stirring the mixture by a dissolver at 1000 to 1500 r.p.m., 80 parts of deionized water was added in small portions to the mixture, followed by further stirring for 30 minutes to obtain a crosslinking agent (C-1) in the form of an aqueous dispersion containing particles of 0.11 μm in mean particle size.

PREPARATION EXAMPLE 8

Preparation of crosslinking agent (C-2)

A crosslinking agent (C-2) was a commercial hydrophilic melamine resin, "Cymel 325," (product of Mitsui Toatsu Chemical Co., Ltd., nonvolatile content 80%, solvent dilution ratio at least 25).

PREPARATION EXAMPLE 9

Preparation of aluminum pigment concentrate

An aluminum paste (23 parts, metal content 65%) and 25 parts of butyl cellosolve were placed into a stirring container and stirred for 1 hour to obtain an aluminum pigment concentrate.

PREPARATION EXAMPLE 10

Preparation of transparent top-coat composition

An acrylic resin solution containing 60% of resin solids was prepared by polymerizing 25 parts of methyl acrylate, 25 parts of ethyl acrylate, 36.5 parts of n-butyl acrylate, 12 parts of 2-hydroxyethyl acrylate and 1.5 parts of acrylic acid in xylene in the presence of 2.5 parts of a polymerization initiator ($\alpha,\alpha'$-azobisisobutyronitrile). The resin was 58 in hydroxyl value and 12 in acid value.

The resin and "Uban 20SE" were mixed together in the solids weight ratio of 75:25, and the mixture was adjusted to a viscosity of 25 seconds (Ford cup No.4/20° C.) with "Swasol #1500" (organic solvent, product of Cosmo Oil Co., Ltd.) to obtain a clear coat composition (T-1).

PREPARATION EXAMPLE 11

Preparation of transparent top-coat composition

A clear coat composition (T-2) was prepared in the same manner as in Preparation Example 10 except that "Duranate 24A" (water adduct of hexamethylene diisocyanate, product of Asahi Chemical Industry Co., Ltd.) used in place of "Uban 20SE" was mixed with the acrylic resin in the OH/NCO mole ratio of 1/1.

EXAMPLE 1

The following ingredients were made into a mixture by adding them one after another with stirring, and the mixture was further stirred for 1 hour.

| | |
|---|---|
| Al pigment concentrate obtained in Prep. Ex. 9 | 48 parts |
| Crosslinking agent (C-1) obtained in Prep. Ex. 7 | 141.7 parts |
| Acrylic resin-type emulsion (A-1) obtained in Prep. Ex. 1 | 175 parts |
| Urethane resin-type emulsion (B-1) obtained Pre. Ex. 3 | 71.4 parts |
| Deionized water | 138.9 parts |

To the resulting composition were added 3 parts of "Acrysol ASE-60" (thickener, product of Rohm & Haas Co.) and 0.28 part of dimethylaminoethanolamine to prepare an aqueous metallic base-coat composition (M-1) according to the invention. The composition (M-1) had the following characteristics.

| | |
|---|---|
| Apparent viscosity | 3000 cps/6 r.p.m. (B-type viscometer) |
| pH | 7.80 |

EXAMPLES 2-4 and COMPARATIVE EXAMPLES 1-2

In the same manner as in Example 1, the ingredients listed in Table 1 below were mixed together. To each mixture were added "Acrysol ASE-60" and dimethylaminoethanolamine to adjust the mixture to an apparent viscosity of 3000 cps/6 r.p.m. (B-type viscometer) and a pH of 7.80, giving aqueous metallic base coat compositions (M-2) to (M-6), according to the invention or for comparison.

TABLE 1

| | Composition | Al pigment concentrate (parts) | Crosslinking agent (C) Kind | Crosslinking agent (C) Amount (parts) | Acrylic resin emulsion (A) Kind | Acrylic resin emulsion (A) Amount (parts) | Urethane resin emulsion (B) Kind | Urethane resin emulsion (B) Amount (parts) | Deionized water (parts) |
|---|---|---|---|---|---|---|---|---|---|
| Ex. | | | | | | | | | |
| 2 | M-2 | 48 | C-1 | 141.7 | A-2 | 225 | B-2 | 48.8 | 111.5 |
| 3 | M-3 | 48 | C-1 | 141.7 | A-1 | 225 | B-3 | 48.2 | 112.1 |
| 4 | M-4 | 48 | C-2 | 31.3 | A-2 | 225 | B-1 | 71.4 | 199.3 |
| Comp. Ex. | | | | | | | | | |
| 1 | M-5 | 48 | C-1 | 141.7 | A-1 | 325 | — | | 60.3 |
| 2 | M-6 | 48 | C-2 | 31.3 | A-2 | 375 | — | | 120.7 |

The base-coat compositions and the clear topcoat compositions prepared by the foregoing procedures were applied to test pieces by the two-coat one-bake method.

Steel test pieces to be coated were prepared by the following pretreatment. A steel plate surface-treated with "Bonderite #3030" (zinc phosphate treating agent, product of Nihon Parkerrizing Co., Ltd.) was electrophoretically coated with "Electron No.9200" (cationic electrophoretic coating composition of the epoxy resin type, product of Kansai Paint Co., Ltd.) serving as a primer, and was further coated with "Amilac N-2 Sealer" (intercoat composition of the amino resin/polyester resin type, product of Kansai Paint Co., Ltd.).

Each of the base-coat compositions prepared in Examples and Comparative Examples was applied to the test piece twice with a spray gun at a temperature of 25° C. and a relative humidity of 65%. The first coating was allowed to set for 2 minutes before the second application of the composition. The spray gun was used at an air pressure of 5 kg/cm$^2$ and at a composition flow rate of 350 ml/min and was positioned at a distance of 35 cm from the test piece. The test piece was held in a vertical position during the entire coating operation. The test piece as coated the second time was held in the same environment to stand for 2 minutes, then dried in air at a temperature of 80° C. for 10 minutes and thereafter cooled to room temperature. Subsequently, using a electrostatic gun, the test piece was coated with the clear-coat composition prepared in Preparation Example 10. The coating was allowed to set for 5 minutes and then baked at 120° to 140° C. for 30 minutes. In this way, the test piece was coated by the two-coat one-bake method.

Plastics test pieces to be coated were prepared as follows. A substrate of polyurethane was subjected to vapor degreasing with trichloroethane for 1 minute. A urethane elastomer primer ("SOFLEX No. 1000 primer," product of Kansai Paint Co., Ltd.) was applied by spraying to the substrate to a dry thickness of 15 μm and dried at 80° C. for 30 minutes. A base-coat composition and a top-coat composition were applied in the same manner as for a steel test piece. The top-coat composition used was one prepared in Preparation Example 11 and the coated test piece was baked at 120° C. for 30 minutes.

Table 2 shows the results obtained by testing the coatings formed on test pieces from the base-coat compositions and clear coat compositions for finishing properties and other properties.

The test methods are as follows.

(1) Finishing properties

To check sagging (listed as "Sag"), the test piece was formed with a hole, 10 mm in diameter, and the length of sagging of the applied composition formed downward from the hole was measured. The mark A represents 0- to 2-mm-long sagging, the mark B 2- to 4-mm-long sagging, and the mark C 4- to 6-mm-long sagging.

The coating was checked for mottling (listed as "Mot") with the unaided eye. The mark A represents almost no mottling, the mark B some mottling, and the mark C marked mottling.

(2) Resistance to chipping

A gravel impact testing machine (product of Suga Tester K.K., "JA-400" model) was used. A test piece coated with the compositions was held in a vertical position by a test piece holder in the tester. Crushed stones (No.7, 50 g) were forced out at an air pressure of 4 kg/cm$^2$ applied by the tester to cause the stones to clash against the test piece at an angle of 90° C. Thereafter the test piece was washed with water and dried. The film pieces afforded by chipping were removed from the test piece with an adhesive tape. Thereafter the degree of chipping was evaluated according to the following ratings.

| | Size of each film piece | Number of film pieces* |
|---|---|---|
| 1. | No peel occurred in coating except for a slight scratching. | |
| 2. | 0.5 mm or less | 10 or less |
| 3. | 0.5 to 1.0 mm | 20 to 40 |
| 4. | 1.0 to 2.0 mm | 30 to 60 |
| 5. | 1.5 to 3.0 mm | 50 to 80 |

(Note: *number of film pieces given within a square area of 3 cm in each side)

The test piece was immersed for 5 to 10 minutes in a dry ice/methanol mixture cooled to −25° C. Thereupon it was withdrawn therefrom and immediately (within a few minutes) subjected to the chipping resistance test by the foregoing method. The test piece was maintained at a temperature of −20±5° C. during the test.

(3) Humidity resistance

Using a wetting tester (product of Suga Tester K.K.), a test piece was placed into a chamber maintained at a temperature of 49±1° C. and a relative humidity of 98% and was left to stand for 240 hours.

On withdrawal of test piece from the chamber, the waterdrops were wiped away from the test piece. The coating on the test piece was checked to evaluate the undesired change such as blistering, shrinkage and the like, comparing the test piece before testing. The mark A represents no change and the mark B a slight degree of blistering, shrinkage and/or the like.

(4) Impact resistance

A 500-gram weight was dropped onto the coated surface of test piece using a Du Pont impact tester (impact rod of ½ in. in radius) to determine a maximum distance of fall (cm) at which the coating remained free of cracking.

TABLE 2

| Ex. | Base-coat composition Kind | Base-coat composition Dry coat thickness | Clear coat composition Kind | Clear coat composition Dry coat thickness | Finishing properties Sag | Finishing properties Mot | Chipping resistance | Humidity resistance | Impact resistance |
|---|---|---|---|---|---|---|---|---|---|
| Example | | | | | | | | | |
| 1 | M-1 | 15 μ | T-1 | 40 μ | A | A | 1 | A | 35 |
| 2 | M-2 | " | T-1 | " | A | A | 2 | A | 30 |
| 3 | M-3 | " | T-1 | " | A | A | 2 | A | 30 |
| 4 | M-4 | " | T-1 | " | A | B | 2 | B | 30 |
| 5 | M-1 | " | T-2 | " | A | A | 1 | A | 50 |
| Comp. Ex. | | | | | | | | | |
| 1 | M-5 | 15 μ | T-1 | 40 μ | A | A | 4 | A | 15 |
| 2 | M-6 | " | T-1 | " | A | B | 4 | B | 15 |

Note: Steel test pieces were used in Examples 1–4 and Com. Examples 1 and 2, and a plastics test piece was used in Example 5.

Table 2 reveals that the coatings formed from the aqueous coating compositions of the present invention exhibited good finishing properties and displayed an outstanding resistance to chipping and high impact resistance without reduction of humidity resistance.

Because of use of urethane resin-type emulsion, the aqueous coating compositions of the invention have high resistance to chipping and shows excellent surface smoothness, good distinctness-of-image gloss and high weatherability when used a base-coat composition in the two-coat one-bake coating method.

We claim:
1. An aqueous coating composition comprising:
   (A) a hydroxy group-containing acrylic resin-type emulsion prepared by subjecting to emulsion polymerization at least one acrylic monomer selected from the group consisting of hydroxy group-containing (C$_2$-C$_{10}$ alkyl) acrylates and hydroxy group-containing (C$_2$-C$_{10}$ alkyl) methacrylates,
(B) a urethane resin-type emulsion and
(C) a crosslinking agent which is at least one member selected from the group consisting of a melamine resin and a phenol formaldehyde resin, the component (B) being a self-emulsifiable urethane emulsion prepared by subjecting a urethane prepolymer to reaction for chain extension by water and to emulsification after or during neutralization of the urethane prepolymer with a tertiary amine, the urethane prepolymer consisting essentially of (i) at least one of an aliphatic diisocyanate and an alicyclic diisocyanate, (ii) at least one of a polyether diol and a polyester diol both having a number-average molecular weight of about 500 to about 5000, (iii) a low-molecular weight polyhydroxyl compound and (iv) a dimethylolalkanoic acid in an NCO/OH ratio by equivalent of 1.1–1.9/1.

2. An aqueous coating composition according to claim 1 wherein the component (ii) is at least one member having a number-average molecular weight of about 1000 to about 3000 and selected from the group consisting of polypropylene glycol, polytetramethylene ether glycol, polycaprolactone diol, poly-3-methylpentyl adipate diol and polyneopentyl/hexyl adipate diol.

3. An aqueous coating composition according to claim 1 wherein the low-molecular weight polyhydroxyl compound (iii) is one having a number-average molecular weight of 500 or less.

4. An aqueous coating composition according to claim 1 wherein the component (iii) is at least one member selected from the group consisting of ethylene glycol, 1,4-butane diol, trimethylolpropane and 1,6-hexanediol.

5. An aqueous coating composition according to claim 1 wherein the acrylic resin-type emulsion (A) is one prepared by subjecting to emulsion polymerization said acrylic monomer and $\alpha,\beta$-ethylenically unsaturated carboxylic acid.

6. An aqueous coating composition according to claim 1 wherein the crosslinking agent (C) is a hydrophobic melamine resin.

7. An aqueous coating composition according to claim 1 wherein the ratio of component (A)/component (C) is between 90/10 and 60/40.

8. An aqueous coating composition according to claim 1 wherein the ratio of mixture of components (A) and (C)/ component (B) is between 95/5 and 20/80.

* * * * *